United States Patent [19]
Boczek

[11] 3,984,084
[45] Oct. 5, 1976

[54] ASSEMBLY APPARATUS FOR NUCLEAR REACTORS

[76] Inventor: Walter Boczek, Skaldenweg 25, 2000 Hamburg 73, Germany

[22] Filed: Sept. 9, 1974

[21] Appl. No.: 504,190

[30] Foreign Application Priority Data
Sept. 13, 1973  Germany............................ 2346226

[52] U.S. Cl................................... 254/188; 212/26
[51] Int. Cl.².......................................... B66D 3/04
[58] Field of Search ........... 254/189, 188, 144, 183, 254/184; 212/20–27; 105/153, 156; 104/183, 199

[56] References Cited
UNITED STATES PATENTS

| | | | |
|---|---|---|---|
| 2,902,183 | 9/1959 | Dodge............................. | 254/189 |
| 3,018,902 | 1/1962 | Minty.................................... | 212/26 |
| 3,103,395 | 9/1963 | Winberg .............................. | 212/20 |
| 3,854,592 | 12/1974 | Mordre..................... | 254/188 |

FOREIGN PATENTS OR APPLICATIONS 1,066,633  12/1963  United Kingdom................... 212/27

*Primary Examiner*—Robert J. Spar
*Assistant Examiner*—Kenneth Noland
*Attorney, Agent, or Firm*—Stevens, Davis, Miller & Mosher

[57] ABSTRACT

Moisting apparatus for assembling and operating a nuclear reactor comprises two rope drums, two gear mechanisms, and two hoisting mechanisms each with one rope for a predetermined load, a change-speed gear mechanism or shiftable gear mechanism for the selectable adjustment of various hoisting speeds for the two hoisting mechanisms, a drive connection which is provided for at least one gear mechanism and permits different distances between the said gear mechanism and the change-speed gear mechanism, a common motor for the two hoisting mechanisms, a rigid connection for the two lifting mechanisms which permits different distances between the lifting mechanisms, and a rope compensating device selectively adjustable so as to be operative or inoperative.

9 Claims, 4 Drawing Figures

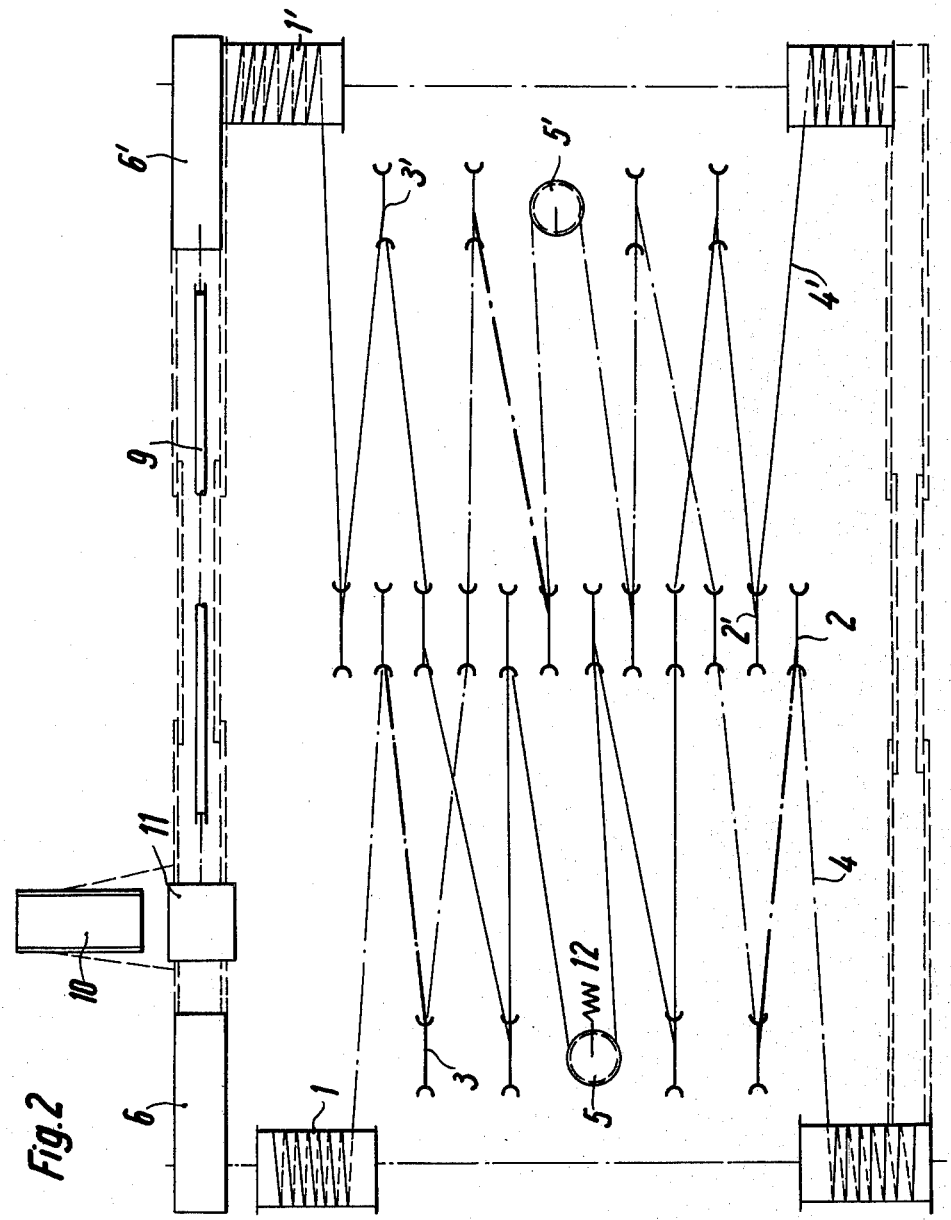

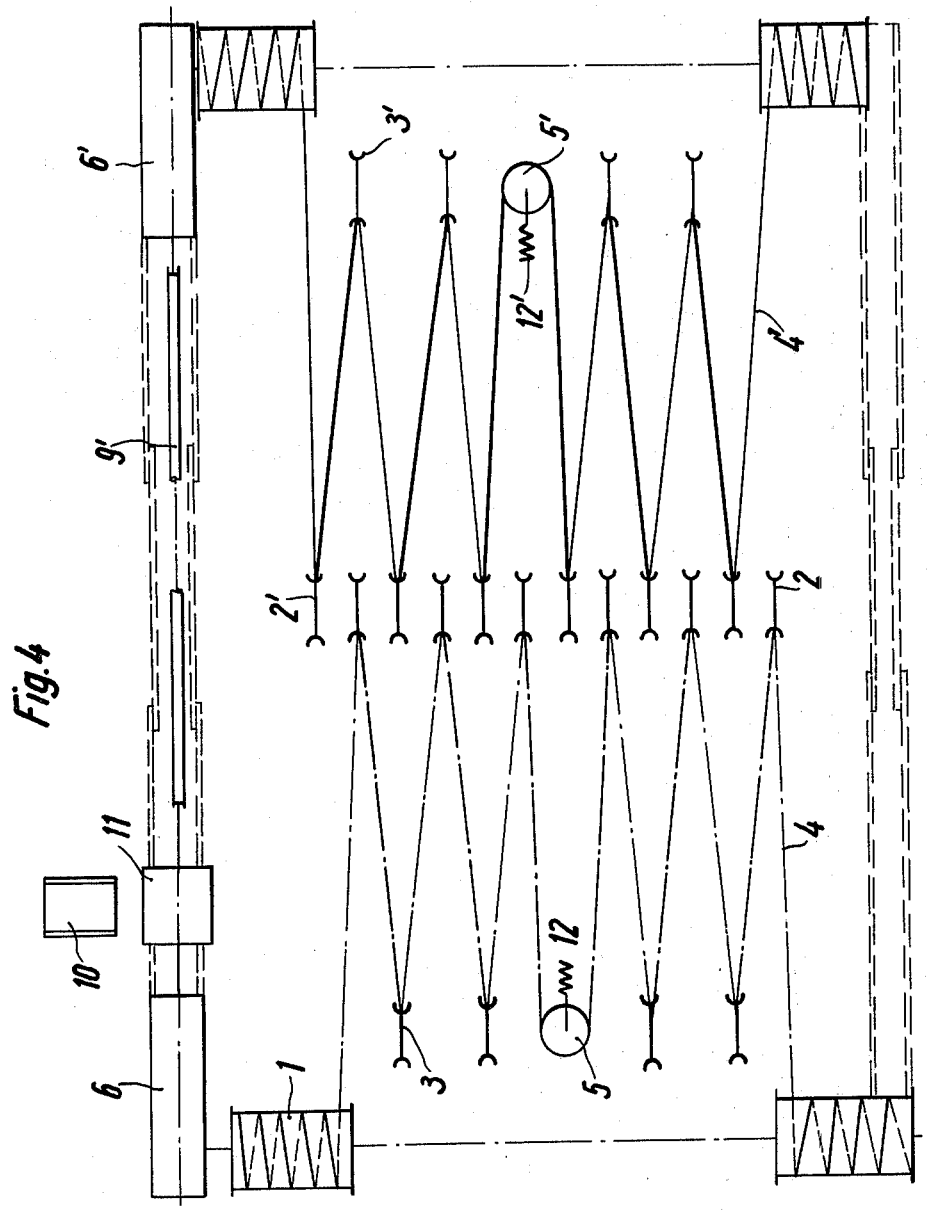

ASSEMBLY APPARATUS FOR NUCLEAR REACTORS

BACKGROUND OF THE INVENTION

The invention relates to an assembly apparatus for nuclear reactors, consisting of two rope drums, two gear mechanisms, and two hoisting mechanisms each with one rope for a predetermined load, a change-speed gear mechanism or shiftable gear mechanism for the selectable adjustment of various hoisting speeds for the two hoisting mechanisms, a drive connection which is provided for at least one gear mechanism and permits different distances between the said gear mechanism and the change-speed gear mechanism, a common motor for the two hoisting mechanisms, a rigid connection for the two lifting mechanisms which permits different distances between the lifting mechanisms, and a rope compensating device selectively adjustable so as to be operative or inoperative.

In the assembly of a nuclear reactor and in the subsequent operation of the completed reactor, a hoisting device is needed and the requirements of the device differ widely from one case to another and can in principle be divided into two classes, namely:

requirements in respect of the hoisting device during the erection of a reactor plant, and requirements in respect of the hoisting device during the actual operation of the reactor or for repair work or work for the replacement of parts of the reactor plant.

In the course of the erection of a reactor plant, the pressure vessel and the heat exchangers, for example, must be brought into the required positions. In nuclear reactors the weight of a pressure vessel amounts to about 500 metric tons; in order to simplify explanations hereinbelow this load will be referred to as 2P. The heat exchangers are generally of substantially cylindrical shape and of relatively great length. This leads to difficulties in determining the height of the hoisting device, since the effective height cannot be made sufficiently high to connect the heat exchanger at its top part to the tackle to a hoisting device to move the heat exchanger over previously completed parts of the foundation or other parts of the reactor which have already been installed. The procedure has therefore been adopted in the assembly work of holding the heat exchanger in the region of its upper half by means of a frame or a yoke, which in turn is suspended on two pulley blocks belonging to two separate trolleys, each of which is capable of lifting a load P. The working speed at which the heat exchanger is raised and lowered is relatively low because of the size and bulky nature of the heat exchanger; in order to simplify the explanations given below this lifting speed will be referred to as V/2.

If hoisting work has to be done during the subsequent operation of the reactor the maximum load to be lifted is the load P, for example when the heat exchanger inserts have to be exchanged. Hoisting work in the assembly of the reactor is however subject to particularly stringent safety regulations, which have been laid down in a "Notice regarding safety requirements for hoisting and conveying equipment in nuclear reactor plants". According to these regulations, two ropes independent of one another must be used for the hoisting device, each of them being able to lift the load P, while in the operating condition only one of the ropes is loaded at any given time, and the other rope is provided without bearing loads in order to be ready for use in the event of the fracture of the first rope, or else a double degree of safety per rope can be achieved by means of two ropes equally sharing the load.

Erection work in nuclear reactor plants has hitherto been carried out in the following manner. For the purpose of erection or assembly use was made of a trolley, which is subsequently used as operating trolley, and of an assembly trolley which is used solely for assembly work and is removed on completion of the assembly. Each of the two trolleys has its own drive motor ropes, gearing, rope drum, and the like, each of the two ropes of the operating trolley and the rope of the assembly trolley being designed for the load P. As already stated, the assembly trolley is not required for the subsequent operation, when the operating trolley only is used. Since on completion of the installation the assembly trolley is removed, this results in the disadvantage that subsequent replacement of the pressure vessel or of the heat exchanger makes it necessary for the assembly trolley to be installed again, since for the load of 2P the additional power for the motor of the assembly trolley is required. In addition the load is too high, and therefore cannot be carried by the tackle.

SUMMARY OF THE INVENTION

The aim of the invention is to provide an assembly apparatus which is equally suitable for both the operating conditions of the hoisting devices for nuclear reactors which have been defined above.

According to the invention this problem is solved by an assembly apparatus for nuclear reactors which consists of two rope drums, hoisting mechanisms, which are provided with gear mechanisms and each of which has a rope for the predetermined load, a change-speed gear mechanism for the selective adjustment of various hoisting speeds for the two hoisting mechanisms, a drive device which is provided for at least one gear mechanism and permits different distances between the said gear mechanism and the change-speed gear mechanism, preferably a motor common to both the hoisting mechanisms, a rigid connection of the two hoisting mechanisms which permits different distances between the latter, and a rope compensating device which can be selectively adjusted to be operative or inoperative.

According to the invention, two operating conditions of the assembly apparatus can be selected.

In the assembly condition the change-speed gearbox is so adjusted that both hoisting mechanisms work at the speed V/2, the rope of each hoisting mechanism being connected to a load tackle in each case. The rope compensating device operates in order to ensure that any different elongation of the ropes will not result (1) in the tipping of the tackle or (2) the oblique suspension of the load. Furthermore, the tackles are joined to a common yoke carrier which embraces the heat exchanger, preferably around its upper half. In this way a load of 2P can be lifted at a speed V/2, for which purpose a drive motor power of $2P \cdot V/2 = PV$ is required.

In the actual operating condition the change-speed gear mechanism is so adjusted that both hoisting mechanisms work at the speed V, but the two ropes pass around a common pulley block, so that neighbouring rope pulleys alternately receive one rope each. The two trolleys are rigidly joined together a short distance apart. A rope compensating device is relieved of load by an adjustment facility, and it is ensured that the load P is carried only by the rope of one hoisting mechanism and that the other rope runs without load, in order to provide the double rope system necessary for safety reasons. As a whole a drive power of $PV$ is also required for the motor in the operating condition. Furthermore, it is possible to adjust the rope compensating device in such a manner that each rope carries an equal load of $P/2$.

The invention provides the advantage that in a combined hoisting mechanism two operating conditions meeting different requirements are possible, while in addition, in contrast to known arrangements of hoisting devices, the pressure vessel or the heat exchangers, for example could be replaced without extensive alterations even after the reactor has been put into operation, although in known constructions this would necessitate the re-installation of the assembly trolley. In addition, another motor is avoided.

BRIEF DESCRIPTION OF THE DRAWINGS

FIG. 2 is a diagrammatical plan view of the apparatus shown in FIG. 1, FIG. 4 is a diagrammatical plan view of an assembly apparatus according to FIG. 3.

DESCRIPTION OF THE PREFERRED EMBODIMENTS

Figure 1:
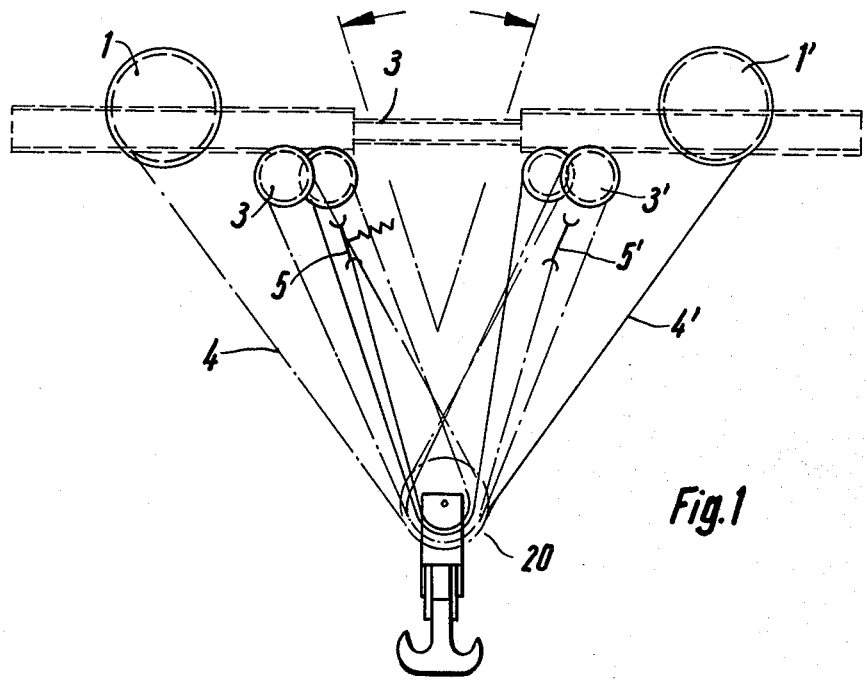
FIG. 1 is a diagrammatical front view of an assembly apparatus, according to the invention, the apparatus being in the operating condition in which only one rope carries load.

In the drawings, parts of the hoisting mechanism on the left-hand side of each of the Figures are given the references 1 to 6, and the corresponding parts of the right-hand hoisting mechanism are given the references 1' to 6'.

The left-hand hoisting mechanism comprises a rope drum 1, a tackle with loose rope wheels 2, upper rope wheels 3, a rope 4 designed for the load P, a compensating roller 5, and a gear mechanism 6 for the rope drum 1. The rope drum 1, the upper rope wheels 3, and the gear mechanism 6 are fastened in the usual manner on a trolley frame (not shown).

FIGS. 1 and 2 show diagrammatically an assembly apparatus in the operating condition of the nuclear reactor, that is to say on completion of the assembly, only one rope carrying load, the other supporting no load. The rope 4 shown on the left in FIG. 2 runs off the rope drum 1 and passes over a loose rope wheel 2 of a pulley block 20, to a rope pulley of the top rope wheel 3. The rope 4 is thence guided over the rope wheel 2 to a rope pulley of the upper rope wheel 3', which is shown on the right in FIG. 2. The rope passes over the rope wheel 2 to the compensating roller 5'. The remainder of the path of the rope 4 is determined by repeating the sequence, the rope passing around the various pulleys in the reverse sequence. The rope 4'is guided in the same way as the rope 4, namely around the rope wheels 2 of the tackle 20 and also around the two upper rope wheels 3 and 3'. A rope compensating device 12 is provided only on one of the two rope rollers, namely on the rope roller 5.

The arrangement described enables only one rope to be loaded, while however the pulley block 20 remains in the centre between the two hoisting mechanisms.

Figure 3:
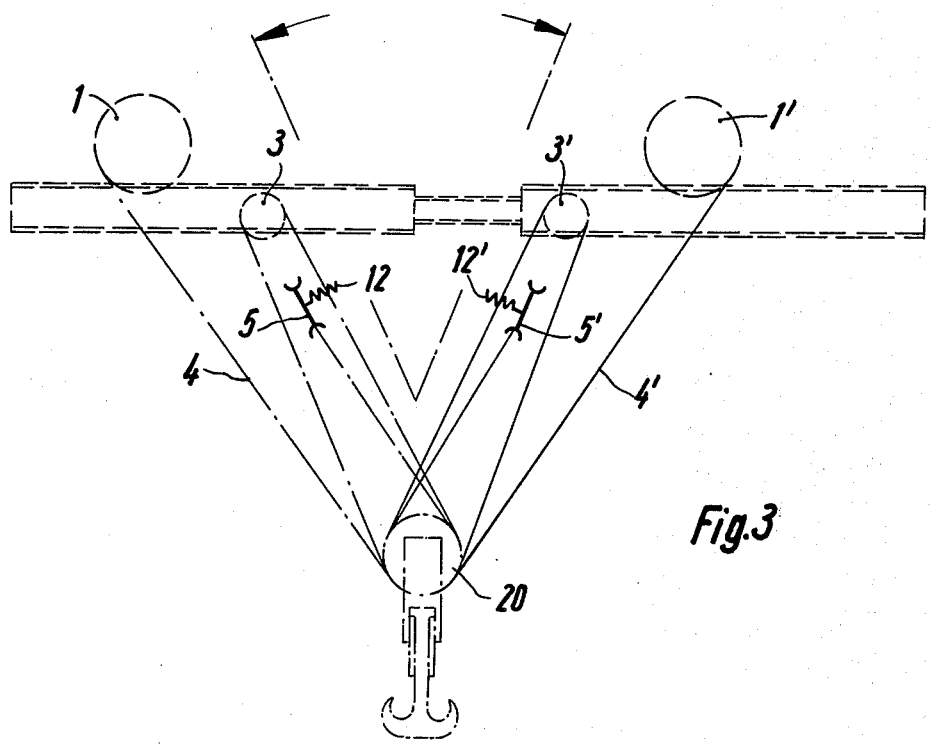
FIG. 3 is a diagrammatical front elevation of an assembly apparatus, according to the invention, the apparatus being in the operating condition in which one rope carries the load and the other has no load.

FIGS. 3 and 4 show an assembly apparatus in accordance with the invention in the actual operating condition of the nuclear reactor, in which both ropes are loaded. For this condition the rope 4 is guided from the rope drum 1 over wheels 20 of a pulley block, which may be composed of the pulleys 2 and 2', over the upper rope wheels 3, and over the compensating roller 5 which is relieved of load, and thence back to the rope drum 1, only each alternate wheel of the pulley block 20 receiving the rope 4. The rope 4' is similarly arranged, being passed over the wheels of the pulley block 20 which are not occupied by the rope 4. As in the assembly condition, the gear mechanism 6 is coupled directly to a change-speed gearing 11, but in contrast to the assembly condition the gear mechanism 6' is drivingly connected by means of a relatively short shaft 9' to the change-speed gearing 11. The change-speed gearing 11 is also this time so adjusted that a hoisting speed of V is possible with a load P. At each of the compensating rollers 5 and 5' a spring is shown in FIGS. 3 and 4, and this is intended to indicate a known rope compensating device 12 and 12'.

In the actual operating condition according to FIGS. 1 and 2, the rope compensating device may be so adjusted that only one of the hoisting mechanisms, either the left-hand or the right-hand mechanism, is loaded and the rope of the hoisting mechanism not carrying the load will run without load in accordance with safety requirements, while in the event of the other rope breaking it will be immediately ready for use, or the two ropes may equally share the load in accordance with FIGS. 3 and 4. Similarly, in accordance with FIGS. 1 and 2 a load P can be lifted at the speed V by one of the hoisting mechanisms while the other hoisting mechanism is in reserve in accordance with the more stringent regulations, in order likewise to lift the load P at the speed V in the event of the breakage of the first rope. In accordance with FIGS. 3 and 4 two hoisting mechanisms each lift P/2 at the speed V. Double safety is also achieved in this manner. It should also be mentioned that in the operating condition the trolley frames of the hoisting mechanism are coupled, by any known means, a short distance from one another.

The compensating rollers 5 and 5' are fastened adjustably on their respective trolley frames, so that in the assembly condition (two-trolley operation) they are disposed practically vertically below the rope drum 1 or 1' respectively and in the actual operating condition (single-trolley operation) they are disposed obliquely below the rope drum 1 or 1' respectively, in the direction of the common pulley block.

In the drawings the rope compensating device 12 is represented symbolically by a spring, but other known forms of construction, for example those which operate through a lever mechanism, a toothed rack, a pressure cylinder or a spindle, may also be used according to the invention for the purpose indicated, provided that a compensating device of this kind can be made operative and inoperative.

We claim:

1. An assembly apparatus for nuclear reactors, comprising two hoisting mechanisms each having rope drum means and associated gear mechanisms, each of said hoisting mechanisms having independent hoisting ropes which are coupled to a common pulley block and its respective drum means, each of said hoisting mechanisms also has means to couple the other rope of the other hoisting mechanism so as to distribute the load between said hoisting mechanisms, a change-speed gear mechanism, or shiftable gear mechanism for the selective adjustment of difference hoisting speeds for the two hoisting mechanisms, a drive connection for at least one gear mechanism which permits different distances between the said gear mechanism and the change-speed gearing, a motor common to both the hoisting mechanisms, a horizontally movable rigid connection between the two hoisting mechanisms which permits different distances between the latter, said rope coupling means having a rope compensating device selectively adjustable to be operative or inoperative.

2. An assembly apparatus according to claim 1, wherein the change-speed gearing has exchangeable pairs of gears for the selective adjustment of proportionate output rotational speeds.

3. An assembly apparatus according to claim 1 wherein the change-speed gearing has exchangeable pairs of gears for the selective adjustment of output rotational speeds which are in a ratio to one another, particularly in the ratio of 1 : 2.

4. An assembly apparatus according to claim 1 wherein the drive connection between the change-speed gearing and one gear mechanism comprises exchangeable shafts of different lengths.

5. An assembly apparatus according to claim 1, wherein the rope compensating device is connected to an adjusting device.

6. An assembly apparatus according to claim 1, wherein said rope coupling means has rope wheels which are combined to form a common pulley block with the same axis of symmetry.

7. An assembly apparatus according to claim 1, wherein the ropes are designed for a load P, the change-speed gearbox for two hoisting speeds V and V/2, and the drive motor for a power PV.

8. An assembly apparatus for nuclear reactors, comprising two hoisting mechanisms each having rope drum means and associated gear mechanisms, each of said hoisting mechanisms having independent hoisting ropes which are coupled to a common pulley block and its respective drum means, each of said hoisting mechanisms also has means to couple the other rope of the other hoisting mechanism so as to distribute the load between said hoisting mechanisms, a change-speed or shiftable gearing for the selective engagement of different hoisting speeds for the two hoisting mechanisms, a drive connection for at least one of the gear mechanisms which permits different distances between the said gear mechanism and the change-speed gearing, a motor common to both the hoisting mechanisms, a horizontally movable rigid connection between the two hoisting mechanisms which permits different distances between the latter, and a rope compensating device which is selectively adjustable to be operative and inoperative, wherein to achieve double safety in the loading of one rope in the operating condition an adjustable rope compensating device is provided for only one of the hoisting mechanisms.

9. An assembly apparatus for nuclear reactors, comprising two hoisting mechanisms each having rope drum means and associated gear mechanisms, each of said hoisting mechanisms having independent hoisting ropes which are coupled to a common pulley block and its respective drum means, each of said hoisting mechanisms also has means to couple the other rope of the other hoisting mechanism so as to distribute the load between said hoisting mechanisms, a change-speed or shiftable gearing for the selective engagement of different hoisting speeds for the two hoisting mechanisms, a drive connection for at least one of the gear mechanisms, a drive connection for at least one of the gear mechanisms which permits different distances between the said gear mechanism and the change-speed gearing, a motor common to both the hoisting mechanisms, a horizontally movable rigid connection between the two hoisting mechanisms which permits different distances between the latter, and a rope compensating device which is selectively adjustable to be operative and inoperative, wherein to achieve double safety in the operating condition for the uniform loading of both ropes each rope is guided over the common pulley block and over a rope wheel in each case.

* * * * *